(12) United States Patent
Farhan et al.

(10) Patent No.: US 7,773,879 B2
(45) Date of Patent: Aug. 10, 2010

(54) DIGITAL OPTICAL TRANSMITTER

(75) Inventors: Forrest M. Farhan, Duluth, GA (US); Alberto P. Gaibazzi, Duluth, GA (US)

(73) Assignee: Scientific Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 11/931,281

(22) Filed: Oct. 31, 2007

(65) Prior Publication Data

US 2008/0063403 A1 Mar. 13, 2008

Related U.S. Application Data

(63) Continuation of application No. 10/283,716, filed on Oct. 30, 2002, now Pat. No. 7,382,981.

(51) Int. Cl.
*H04J 14/00* (2006.01)
(52) U.S. Cl. .................... 398/71; 398/66; 398/182; 725/129; 725/121
(58) Field of Classification Search ............ 398/182, 398/200, 140–141, 32, 66–67, 69–72; 725/105, 725/114, 119, 121, 127, 129, 131, 135, 138, 725/139, 144, 151
See application file for complete search history.

(56) References Cited

U.S. PATENT DOCUMENTS

| 3,995,120 | A | | 11/1976 | Pachynski, Jr. |
| 4,709,418 | A | * | 11/1987 | Fox et al. ............. 398/67 |
| 4,759,018 | A | | 7/1988 | Buchner |
| 4,763,317 | A | | 8/1988 | Lehman et al. |
| 5,018,142 | A | | 5/1991 | Simcoe et al. |
| 5,420,583 | A | | 5/1995 | Knecht |
| 5,426,527 | A | * | 6/1995 | Steen et al. ............. 398/68 |
| 5,544,161 | A | | 8/1996 | Bigham et al. |
| 5,559,624 | A | | 9/1996 | Darcie et al. |
| 5,563,815 | A | | 10/1996 | Jones |
| 5,644,622 | A | | 7/1997 | Russell et al. |
| 5,694,232 | A | * | 12/1997 | Parsay et al. ............. 398/42 |
| 5,790,523 | A | | 8/1998 | Ritchie, Jr. et al. |
| 5,790,533 | A | | 8/1998 | Burke et al. |

(Continued)

FOREIGN PATENT DOCUMENTS

EP 0 318 331 5/1989

OTHER PUBLICATIONS

Farahan, et al.; Non-Final Office Action, mailed Sep. 22, 2004, filing date Oct. 30, 2002, U.S. Appl. No. 10/283,716.

(Continued)

*Primary Examiner*—M. R. Sedighian
(74) *Attorney, Agent, or Firm*—Tarolli, Sundheim, Covell & Tummino LLP

(57) ABSTRACT

A cable television system (100) having forward and reverse paths includes, in the reverse path, a digital optical transmitter (200) for receiving an RF signal, converting it to a digital signal, and adding a digital pilot tone thereto. A laser is driven in accordance with the summed digital signal to generate a digital optical signal representative of the pilot tone and the RF signal. The cable television system (100) also includes an optical receiver (305) for receiving the digital optical signal and recovering therefrom the RF signal and the pilot tone. The optical transmitter (200) and receiver (305) are coupled by fiber optic communication media (110).

16 Claims, 3 Drawing Sheets

U.S. PATENT DOCUMENTS

| | | | |
|---|---|---|---|
| 5,878,325 A | 3/1999 | Dail | |
| 5,896,216 A * | 4/1999 | Kikushima et al. | 398/176 |
| 5,966,636 A | 10/1999 | Corrigan et al. | |
| 6,041,056 A | 3/2000 | Bigham et al. | |
| 6,161,011 A | 12/2000 | Loveless | |
| 6,323,793 B1 | 11/2001 | Howald et al. | |
| 6,373,611 B1 * | 4/2002 | Farhan et al. | 398/182 |
| 6,978,091 B1 * | 12/2005 | Needle | 398/72 |

OTHER PUBLICATIONS

Farahan, et al.; Non-Final Office Action, mailed Jun. 28, 2005, filing date Oct. 30, 2002, U.S. Appl. No. 10/283,716.

Farahan, et al.; Final Office Action, mailed Dec. 28, 2005, filing date Oct. 30, 2002, U.S. Appl. No. 10/283,716.

Farahan, et al.; Notice of Allowance and Fees due, mailed Jul. 23, 2007, filing date Oct. 30, 2002, U.S. Appl. No. 10/283,716.

* cited by examiner

DIGITAL OPTICAL TRANSMITTER

CROSS-REFERENCE TO RELATED APPLICATION

This application is a continuation of U.S. utility application Ser. No. 10/283,716, now U.S. Pat. No. 7,382,981, filed Oct. 30, 2002, which is entirely incorporated herein by reference.

FIELD OF THE INVENTION

This invention relates generally to fiber optic communications, and more specifically to optical transmitters for use in fiber optic communications.

BACKGROUND OF THE INVENTION

Cable television systems typically include a headend section for receiving satellite signals and demodulating the signals to baseband. The baseband signal is then converted to an optical signal for transmission from the headend section over fiber optic cable. Optical transmitters are distributed throughout the cable system for splitting and transmitting optical signals, and optical receivers are provided for receiving the optical signals and converting them to radio frequency (RF) signals that are further transmitted along branches of the system over coaxial cable rather than fiber optic cable. Taps are situated along the coaxial cable to tap off the cable signals to subscribers of the system.

Various factors influence the ability to accurately transmit and receive optical signals within a cable television system. As the length of fiber optic cable within a system increases, for example, signal losses also increase. Furthermore, temperature fluctuations, which cause variation in the optical modulation index of the optical transmitter, can result in variation of the radio frequency (RF) output level of the optical receiver. Signal distortions can be caused by non-linearities in the laser and photodiode of the optical transmitter.

Although these problems can be mitigated by employing expensive techniques, e.g., decreasing fiber lengths between optical nodes, such techniques may prohibitively increase costs to both subscribers and service providers. Thus, what is needed is a better way to provide reliable and accurate transmission of optical signals within a cable television system.

DETAILED DESCRIPTION

Figure 1:
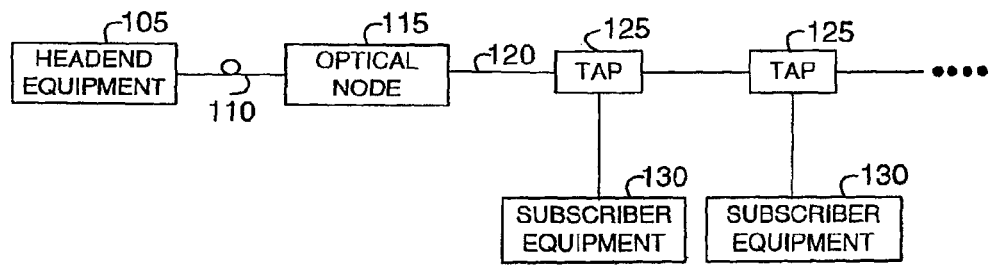
FIG. 1 is a block diagram of a cable television system in accordance with the present invention.

FIG. 1 shows a communications system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend 105 can, for instance, convert the baseband signal to an optical signal that is transmitted over fiber optic cable 110, in which case a remotely located optical node 115 converts the optical signal to an electrical radio frequency (RF) signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the RF signals to optical signals for transmission over the fiber optic cable 110 to the-headend 105.

Figure 2:
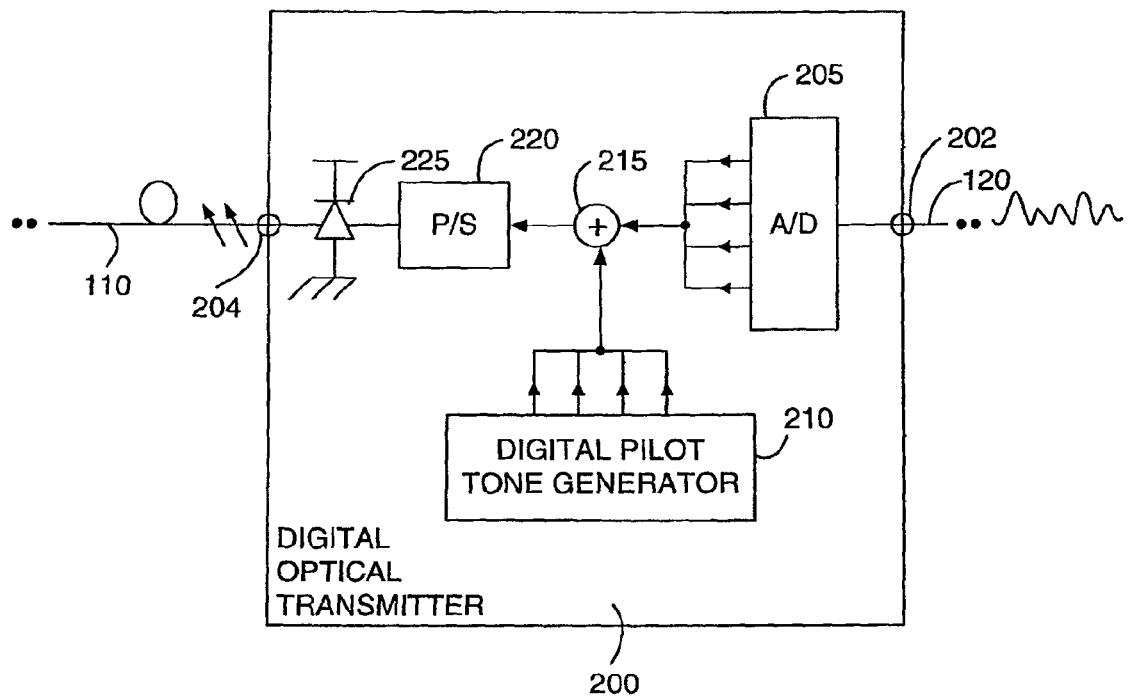
FIG. 2 is an electrical block diagram of an optical transmitter included in the cable television system of FIG. 1 in accordance with the present invention.

Referring to FIG. 2, a digital reverse transmitter 200 is provided for transmitting digital optical signals to the headend 105 in the reverse direction. The transmitter 200 can, for instance, be included within the optical node 115, although other locations within the cable television system 100 may also include the digital reverse transmitter 200 of the present invention. The transmitter 200 receives, at an input 202, an analog information signal that is representative of one or more reverse RF signals from the subscriber equipment 130. At its output 204, the transmitter 200 provides a digital optical signal that is generated in accordance with the analog information signal as well as an optional pilot tone that serves to provide a reference level during processing at the headend 105.

More specifically, the digital reverse transmitter 200 includes an analog-to-digital (A/D) converter 205 for converting the analog input to a digital signal, i.e., a digital word comprising a particular number of bits, in a conventional manner. The resolution of the A/D converter 205, of course, is dependent upon transmitter design parameters. The transmitter 200 can also include a digital pilot tone generator 210 for providing a digital pilot tone in the form of a number of bits representative of a particular level and frequency. The digital pilot tone generator 210 could, for instance, include input switches by which the level and frequency could be varied. U.S. Pat. No. 5,563,815 to Jones, the teachings of which are hereby incorporated by reference, shows a digital tone oscillator that could be used to implement the generator 210 included in the transmitter 200 of the present invention.

A summer 215 receives the digital information signal from the A/D converter 205 and the digital pilot tone signal from the generator 210 and digitally adds the two signals by performing binary addition in a known manner. The summed signal is then coupled to a parallel-to-serial (P/S) converter, or a serializer 220, which receives the parallel inputs representative of the summed signal and converts the inputs into a serial bit stream. A laser diode 225 is then driven to generate an optical signal in accordance with the serial bit stream. It will be appreciated that the serializer 220 can also include a driver for driving the laser diode 225 and-frame encoding circuitry for encoding the serialized digital signal into frames of data.

Figure 3:
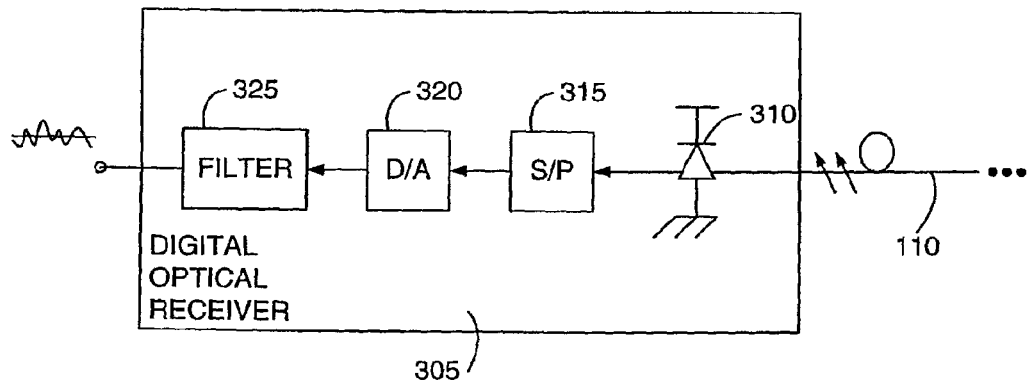
FIG. 3 is an electrical block diagram of an optical receiver included in the cable television system of FIG. 1 in accordance with the present invention.

FIG. 3 is a block diagram of an optical receiver 305 for receiving the digital optical signal transmitted by the optical transmitter 200. The receiver 305 can be, for instance, located in the headend 105, although other locations, such as any intervening nodes, may also employ the receiver 305. The receiver 305 includes a detector, such as a photodiode 310, for receiving the digital optical signal transmitted over the fiber optic cable 110 and generating therefrom a serial stream of electrical pulses in accordance with the optical signal. The output signals provided by the photodiode 310 are coupled to a serial-to-parallel (P/S) converter 315 for generating therefrom a set of parallel outputs corresponding to a digital word. The receiver 305 further includes a digital-to-analog (D/A) converter 320 for converting the signal provided at its digital input to an analog signal in a known manner. Thereafter, the analog signal is processed by a filter 325 to separate the pilot tone signal from the information signal. More specifically, the filter 325 preferably comprises a low pass filter that only passes the fundamental frequency component of the output of the D/A converter 320. As a result, the digital optical receiver 305 is able to provide at its output a reference signal, i.e., the pilot tone, and an analog signal that approximates the analog information signal initially provided to the optical transmitter 200. Furthermore, this can be done without encountering many of the problems that arise in prior art designs.

In conventional cable television systems, optical links in the reverse path use amplitude modulation to directly modulate a laser generating a reverse optical signal. As a result, RF output level of the optical receiver is directly dependent upon the optical modulation index (OMI), which in turn is directly related to the RF drive current, the laser threshold current, and the laser bias current of the laser located in the transmitter. Since the laser bias and threshold currents vary with temperature, which in turn causes temperature variations of the OMI, the RF output level of the optical receiver also varies with temperature. However, the laser within the transmitter 200 of the present invention is digitally modulated so that the RF level information is encoded according to a bit stream; as a-result, variations in the OMI, the-laser bias current, the laser threshold current, and the temperature do not affect RF output levels of the optical receiver 305. Prior art optical transmission that use AM modulation also result in a system in which the linearity of the received optical signal is directly dependent upon the linearity of the transmitting laser and the receiving photodiode. Therefore, non-linearities of those devices can greatly degrade the performance of the reverse path system. Additionally, the non-linear conversion processes of lasers and photodiodes in conventional systems vary with temperature, thus further degrading the performance. Conversely, the digital optical system, i.e., the digital optical transmitter 200 and the digital optical receiver 305, of the present invention only generates and resolves two amplitude levels rather than a continuum of levels. As a result, linearity requirements of the laser and photodiode are reduced, which results in better performance and less expense.

Another problem associated with conventional cable television systems is that reverse pilot tones are seldom used due to the complications and costs. When such pilot tones are used, an additional oscillator, which is not digital, is generally located outside the transmitter and is susceptible to temperature variations. The oscillator signal is combined with the analog RF signal, and the combined signal is used to modulate the laser diode current to provide an optical output. Prior art pilot tones are used by an optical transmitter to ensure that there is always a minimum RF signal modulating the laser, thereby decreasing the spurious noise generated by the laser, and by an optical receiver for gain control purposes. However, since oscillator output level drifts with temperature, the RF output level of the optical receiver will also drift with temperature so that gain control is essentially useless. As mentioned above, use of the combined digital pilot tone and digital information signal according to the present invention solves the prior art temperature dependency problems. At the same time, the digital pilot tone can be used by the transmitter 200 to modulate the laser even when no RF input is present.

Still another advantage of the digital optical transmitter 200 and receiver 305 of the present invention is that the cable system 100 can, without significant cost or performance penalties, employ an architecture in which fiber stretches deeper into the system 100. As a cable television signal travels along a fiber optic cable 110, the signal decreases in power as a result of laser noise, Rayleigh backscattering, photodiode shot noise, receiver amplifier noise, unmodulated Fabry-Perot sporadic noise, and post amplifier intrinsic noise. These factors cause the carrier-to-noise ratio (CNR) to decrease. Conventionally, this problem is mitigated by driving the transmitter laser with more power and/or increasing the receive sensitivity of the receiver photodiode at great expense. However, this need not be done in a system 100 according to the present invention since the noise sources and corresponding signal degradation resulting from increased fiber lengths does not affect recovery of information to the same extent as in prior art systems.

Figure 4:
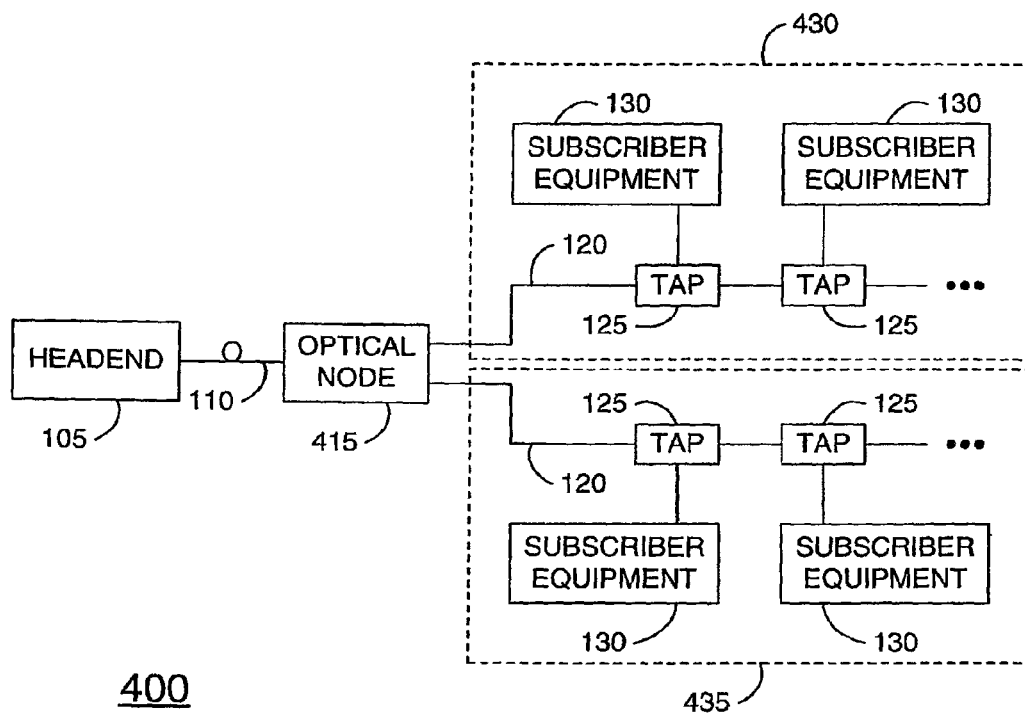
FIG. 4 is a block diagram of a cable television having multiple outputs to subscriber regions in accordance with the present invention.

Referring next to FIG. 4, a modified cable television system 400 is depicted. The system 400 includes a headend 105 for generating cable television signals that are split off to subscriber equipment 130 by taps 125. However, in the system 400, the optical node 415 splits off the downstream cable signal for transmission to multiple distribution systems 430, 435, or branches. Each branch typically provides service to subscribers located in different geographic regions. Upstream reverse signals provided by subscriber equipment 130 in the different branches 430, 435 is transmitted in the form of analog RF signals to the optical node 415, which combines the signals for further upstream transmission in the form of an optical signal. According to the present invention, the upstream signals from the different branches 430, 435 can be converted to a digital optical signal in a manner that minimizes or eliminates many of the problems associated with prior art cable television systems.

Figure 5:
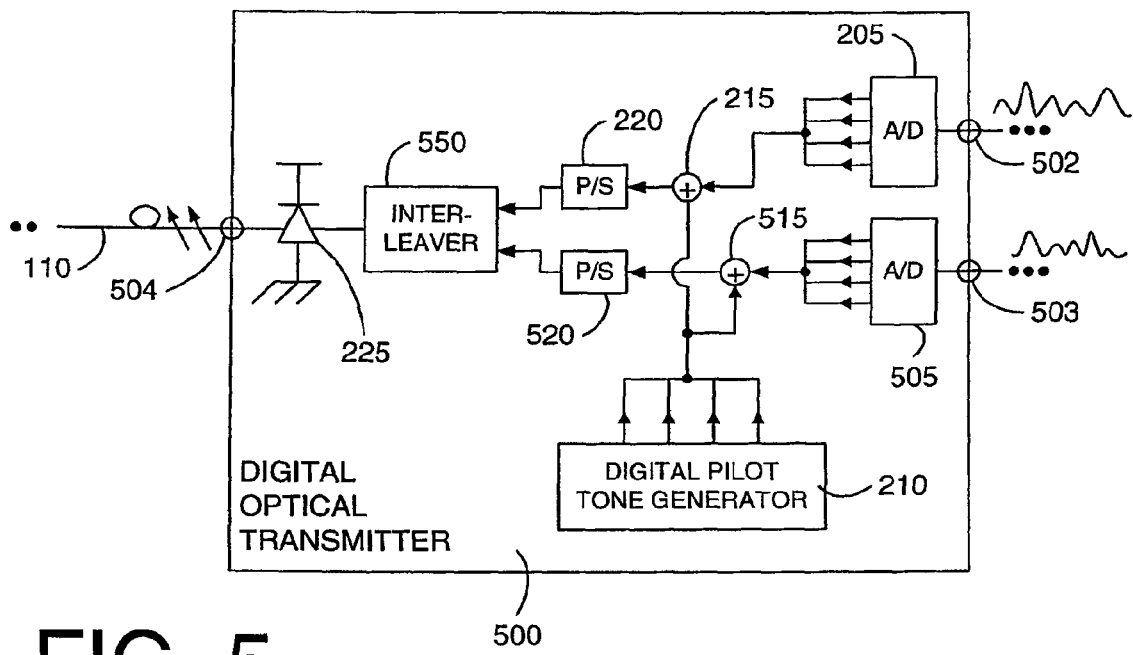
FIG. 5 is an electrical block diagram of an optical transmitter included in the cable television system of FIG. 4 in accordance with the present invention.

FIG. 5 is an electrical block diagram of an optical transmitter 500 that can, in accordance with the present invention, be used to process multiple analog inputs. At input 502, the transmitter 500 receives a first analog input, such as from a first branch 430 of a cable television system 400, and, at input 503, the transmitter 500 receives a second analog input, such as from a second branch 435 of the system 400. First and second A/D converters 205, 505 respectively convert the received RF signals to digital information signals that are separately summed, by summers 215, 515, with the digital pilot tone. Each summed signal is then serialized by serializers 220, 520 to result in first and second serial bit streams that are representative of the first and second RF signals, respectively, as separately combined with the digital pilot tone. According to the present invention, bits of the serial bit streams are interleaved by an interleaver 550 to form a single digital signal that modulates the laser diode 225. As a result, a single digital optical signal can be provided at the output 504 of the transmitter 500.

Figure 6:
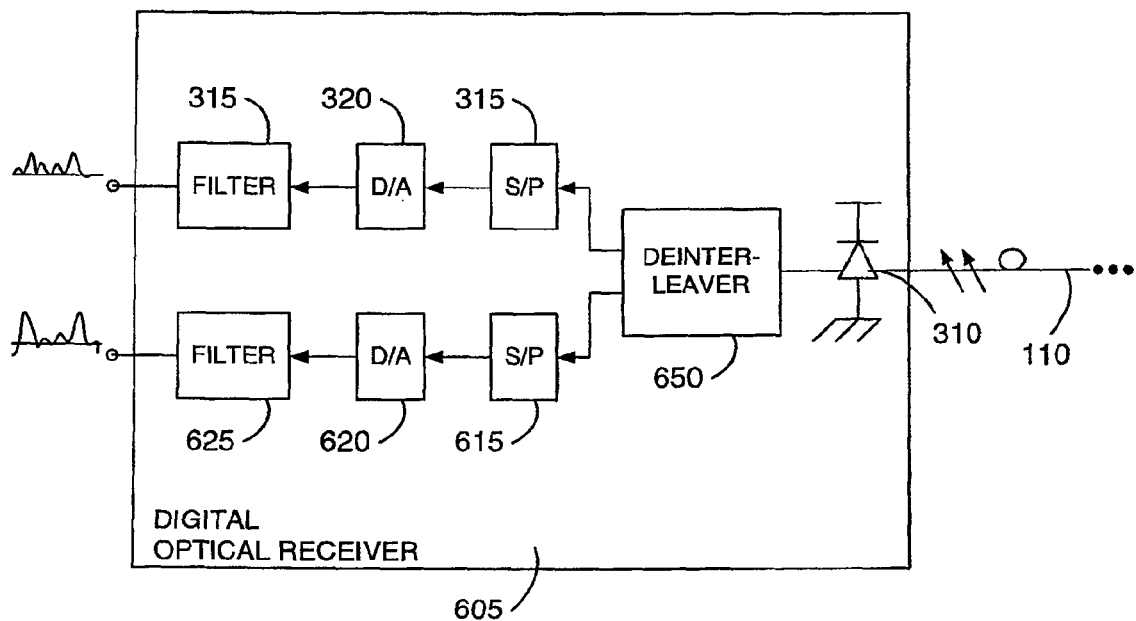
FIG. 6 is an electrical block diagram of an optical receiver included in the cable television system of FIG. 4 in accordance with the present invention.

Referring to FIG. 6, an optical receiver 605 for processing the digital optical signal generated by the transmitter 500 is shown. The receiver 605 includes a photodiode 310 for generating electrical pulses from the optical signal and a deinterleaver 650 for deinterleaving the signal comprising the electrical pulses. Once the deinterleaver 650 has separated the received signal into separate serial bit streams, the outputs are coupled to first and second S/P converters 315, 615, first and second D/A converters 320, 620, and first and second filters 325, 625 to recover approximations of the pilot tone and the RF signals that were provided to the transmitter 500.

It will be appreciated that the interleaver 550 and the deinterleaver 650 can be implemented using conventional components. Typically, the interleaver 550 could be a framing device capable of implementing a time-domain-multiplexing (TDM) scheme with respect to the incoming bit streams. In such an implementation, a frame clock (not shown) would be coupled to the interleaver 550, and one frame would consist of a number of sub-frames equivalent to the number of incoming bit streams. A flag bit would likely be inserted into the frame for identifying the start of the frame. The deinterleaver 650 is capable of extracting the frame clock signal from the incoming information and recognizing the flag bits indicative of frame starts. Each bit would then be routed to its respective bit stream to recover the original signals.

Although only two input branches into the transmitter 500 and two processing paths through the transmitter 500 and the receiver 605 are shown, a plurality of paths can be provided depending upon the number of incoming analog signals to be processed by the transmitter 500. For example, if five RF signals are traveling in the reverse paths of five branches of a cable television system, the optical transmission system according to the present invention would individually convert each reverse signal to a digital signal, add it to the pilot tone, and serialize the combined signal. All serialized signals would then be combined by the interleaver 550 to generate a bit stream for modulating the laser diode 225 (FIG. 5). On the receiver end, the deinterleaver 650 would deinterleave the received digital optical signal to provide five serial signals that would be individually processed by SIP converters, D/A converters, and filters to provide five analog outputs as well as an approximation of the pilot tone.

In this manner, reverse signals of the same frequency can be conveniently sent to the headend 105 over the same return fiber 110. This is very important since cable television systems typically only allocate a small amount of bandwidth, e.g., 5-40 MHZ, for return path transmissions, which means that varying the frequency of each return path signal would not be practical.

In summary, the reverse digital transmission system described above provides one or more reverse signals without many of the problems present in prior art systems. As a result, information can be sent from subscribers to the headend in a more reliable and less expensive manner.

What is claimed is:

1. A method comprising:
   receiving a first analog signal and a second analog signal;
   converting the first analog signal to a first digital signal and the second analog signal to a second digital signal;
   generating a digital pilot tone;
   adding the digital pilot tone to the first digital signal to produce a first summed signal and to the second digital signal to produce a second summed signal;
   converting the first summed signal to a first serial signal and the second summed signal to a second serial signal;
   interleaving bits of the first serial signal with bits of the second serial signal to generate an interleaved signal; and
   producing an optical signal in accordance with the interleaved signal.

2. The method of claim 1, further comprising:
   coupling the analog signal to an A/D converter.

3. The method of claim 1, further comprising:
   driving a laser diode to produce the optical signal.

4. The method of claim 1, further comprising:
   transmitting the optical signal from system subscribers in a reverse path of a cable television system to a headend for further processing.

5. A cable television system for providing signals, the cable television system comprising:
   an optical transmitter included in a reverse communication path for receiving an analog signal that has been received from at least one subscriber in the cable television system, the optical transmitter being configured to transmit in accordance therewith a digital optical signal to a headend for processing, the digital optical signal comprising a digital representation of the analog signal and a digital pilot tone, the digital pilot tone being digitally added to the digital representation of the analog signal, the optical transmitter configured to interface with an optical communication medium for coupling the optical transmitter and an optical receiver, the optical receiver being configured to receive the digital optical signal and to recover therefrom an analog signal representative of the analog signal and a pilot tone level from the digital optical signal.

6. The cable television system of claim 5, wherein the optical transmitter comprises:
   an analog-to-digital (A/D) converter for converting the analog signal to the digital representation of the analog signal;
   a pilot tone generator for generating the digital pilot tone;
   a summer coupled to the A/D converter and the pilot tone generator for adding the digital pilot tone to the digital representation of the analog signal to produce a summed signal; and
   a laser diode coupled to the summer for providing the digital optical signal in accordance with the summed signal.

7. The cable television system of claim of claim 6, wherein the digital pilot tone comprises a number of bits representative of at least a level, the summer digitally adding the digital pilot tone to the digital representation of the analog signal by performing binary addition thereof.

8. The cable television system of claim 6, wherein the optical transmitter further comprises:
   a serializer coupled to the summer and the laser diode for converting the summed signal to a serial signal.

9. The cable television system of claim 8, wherein the optical transmitter further comprises:
   an interleaver coupled to the serializer and the laser diode for interleaving bits of the serial signal.

10. The cable television system of claim 9, wherein the optical transmitter further comprises:
    circuitry, coupled to the interleaver, for receiving a second analog signal, converting the second analog signal to a second digital signal, which is summed with the digital pilot tone and serialized to result in a second serial signal, and for providing the second serial signal to the interleaver, wherein the interleaver interleaves bits of the serial signal with bits of the second serial signal to drive the laser diode.

11. The cable television system of claim 5, wherein the optical receiver comprises:
- a detector for converting the digital optical signal to a digital electrical signal;
- a digital-to-analog (D/A) converter for converting the digital electrical signal to an analog electrical signal; and
- a filter for processing the analog electrical signal to recover therefrom the pilot tone and a representative analog signal.

12. A cable television system for providing signals, the cable television system comprising:
- an optical receiver located at a headend of the cable television system configured to receive satellite signals, to demodulate the satellite signals into one of baseband and intermediate frequency signals, and to transmit the one of the baseband and intermediate frequency signals to a plurality of subscribers as an optical signal in a forward communication path, the optical receiver being also configured to receive a digital optical signal from at least one of the plurality of subscribers via a reverse communication path and for recovering therefrom an analog signal, the optical receiver being further configured to interface with an optical communication medium for coupling the optical receiver with an optical transmitter, wherein the optical receiver comprises:
  - a detector for converting the digital optical signal to a digital electrical signal;
  - a digital-to-analog (D/A) converter for converting the digital electrical signal to an analog electrical signal; and
  - a filter for processing the analog electrical signal to recover therefrom a pilot tone and a representative analog signal.

13. The cable television system of claim 12, wherein the digital electrical signal is an interleaved digital electrical signal, the optical receiver further comprising:
- a deinterleaver configured to deinterleave the interleaved digital electrical signal to generate a plurality of serial digital electrical signals that each corresponds to a separate communication signal transmitted from a respective separate subscriber branch of the cable television system;
- a serial-to-parallel converter configured to convert each of the serial digital electrical signal to a respective parallel digital electrical signal;
- a digital-to-analog (D/A) converter for converting each of the respective parallel digital electrical signals to a respective analog electrical signal; and
- a filter for processing each of the respective analog electrical signals to recover therefrom an approximation of a pilot tone and a representative analog signal.

14. The cable television system of claim of claim 12, wherein the digital electric signal includes a digital version of the pilot tone, the digital version of the pilot tone comprising a number of bits representative of at least one of a reference level and a frequency, wherein the digital version of the pilot tone and a digital version of the representative analog signal are added together to form the digital electric signal via binary addition.

15. A method comprising:
- receiving an analog signal;
- converting the analog signal to a digital signal, wherein the digital signal comprises a digital word comprising a number of bits;
- generating a digital pilot tone, wherein the digital pilot tone comprises a number of bits representative of a level and a frequency;
- adding the digital pilot tone to the digital signal to produce a summed signal, wherein the adding of the digital pilot tone to the digital signal further comprises performing binary addition of the digital pilot tone and the digital signal; and
- producing an optical signal in accordance with the summed signal.

16. A cable television system comprising:
- a headend configured to receive broadcast signals from a satellite, to demodulate the broadcast signals, and to optically transmit the broadcast signals via a fiber optic cable in a forward communication path;
- an optical node configured to receive the broadcast signals via the fiber optic cable, to convert the broadcast signals to digital electrical signals, and to transmit the digital electric signals to a plurality of subscribers via a coaxial cable in the forward communication path;
- wherein the optical node comprises an optical transmitter for receiving at least one reverse analog information signal via the coaxial cable from at least one of the plurality of subscribers in the cable television system, the optical transmitter being configured to convert the analog information signal into a reverse digital optical signal and to transmit the reverse digital optical signal to the headend via the fiber optical cable, the reverse digital optical signal comprising a digital representation of the reverse analog information signal and a digitally generated pilot tone that has been digitally added to the digital representation of the reverse analog information signal.

* * * * *

UNITED STATES PATENT AND TRADEMARK OFFICE
CERTIFICATE OF CORRECTION

PATENT NO. : 7,773,879 B2  Page 1 of 1
APPLICATION NO. : 11/931281
DATED : August 10, 2010
INVENTOR(S) : Forrest M. Farhan and Alberto P. Gaibazzi It is certified that error appears in the above-identified patent and that said Letters Patent is hereby corrected as shown below:

On the Title page of the Patent, the Related U.S. Application Data, item (63), should be changed to:

Continuation of application No. 10/283,716, filed on Oct. 30, 2002, now Pat. No. 7,382,981; which is a continuation of application No. 09/872,307, filed on June 1, 2001, now abandoned; which is a continuation of application No. 09/102,344, now U.S. Patent No. 6,373,611.

Also in the Cross-Reference to Related Applications section of this application, please replace the full paragraph Column 1, lines 6-8, should be changed to:

--This application is a continuation of co-pending U.S. utility application number 10/283,716 filed October 30, 2002, now U.S. Patent No. 7,382,981, which is entirely incorporated herein by reference and which is a continuation of U.S. patent application Ser. No. 09/872,307, entitled "Digital Optical Transmitter," filed June 1, 2001 now abandoned, which is a continuation of Ser. No. 09/102,344, now U.S. Pat. No. 6,373,611, entitled "Digital Optical Transmitter," filed June 22, 1998.--

Signed and Sealed this

Nineteenth Day of October, 2010

David J. Kappos
*Director of the United States Patent and Trademark Office*